(12) United States Patent
Morris et al.

(10) Patent No.: US 10,302,885 B2
(45) Date of Patent: May 28, 2019

(54) FIBER TERMINAL RACK MOUNT WITH FRONT-TO-BACK FIBER ROUTING MANAGEMENT

(71) Applicant: Corning Optical Communications LLC, Hickory, NC (US)

(72) Inventors: Richard David Morris, Fort Worth, TX (US); Diana Rodriguez, Fort Worth, TX (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/788,341

(22) Filed: Oct. 19, 2017

(65) Prior Publication Data
US 2018/0129004 A1 May 10, 2018

Related U.S. Application Data

(60) Provisional application No. 62/417,639, filed on Nov. 4, 2016.

(51) Int. Cl.
   *G02B 6/44* (2006.01)
(52) U.S. Cl.
   CPC .......... *G02B 6/4452* (2013.01); *G02B 6/445* (2013.01)
(58) Field of Classification Search
   CPC ..... G02B 6/445; G02B 6/4452; G02B 6/4463
   See application file for complete search history.

(56) References Cited

U.S. PATENT DOCUMENTS

| | | | | |
|---|---|---|---|---|
| 5,209,356 A | * | 5/1993 | Chaffee | A47B 81/064 211/26 |
| 5,640,482 A | * | 6/1997 | Barry | G02B 6/4452 385/134 |
| 6,181,549 B1 | * | 1/2001 | Mills | H05K 7/1489 292/114 |
| 6,830,466 B2 | * | 12/2004 | Mendoza | H04Q 1/064 439/136 |
| 7,083,051 B2 | * | 8/2006 | Smith | G02B 6/4452 211/26 |
| 7,562,779 B2 | * | 7/2009 | Bravo | H05K 7/1449 211/26 |
| 8,290,331 B2 | * | 10/2012 | Redmann | G02B 6/4452 29/428 |

(Continued)

*Primary Examiner* — Daniel Petkovsek
(74) *Attorney, Agent, or Firm* — Grant A. Gildehaus

(57) ABSTRACT

A fiber terminal rack mount with front-to-back fiber routing management is disclosed herein. The terminal rack mount is configured to be mounted in a remote terminal to facilitate fiber management of fiber optic cables routed from fiber optic equipment. In exemplary aspects disclosed herein, the fiber terminal rack mount comprises two vertically oriented panels with a plurality of horizontally oriented shelves positioned therebetween. The panels are configured to mount to vertical rails of a remote terminal cabinet of the fiber terminal. The panels and shelves also define routing channels for routing fiber optic cables therethrough, thereby facilitating front-to-back fiber routing between fiber optic equipment mounted in the fiber terminal. In this manner, as an example, the fiber terminal rack mount may more easily support fiber routing between back-to-back mounted fiber optic equipment, which may increase as fiber optic connectivity density increases.

22 Claims, 11 Drawing Sheets

(56) References Cited

U.S. PATENT DOCUMENTS

| | | | |
|---|---|---|---|
| 8,787,023 B2* | 7/2014 | Lewis, II | H05K 7/18 |
| | | | 361/724 |
| 9,326,417 B2* | 4/2016 | Ritter | H04Q 1/06 |
| 9,383,538 B2 | 7/2016 | Giraud et al. | |
| 2003/0185535 A1* | 10/2003 | Tinucci | G02B 6/4452 |
| | | | 385/134 |
| 2006/0067068 A1* | 3/2006 | Petersen | H04Q 1/142 |
| | | | 361/788 |
| 2011/0317971 A1* | 12/2011 | Zhang | H04Q 1/06 |
| | | | 385/135 |

\* cited by examiner

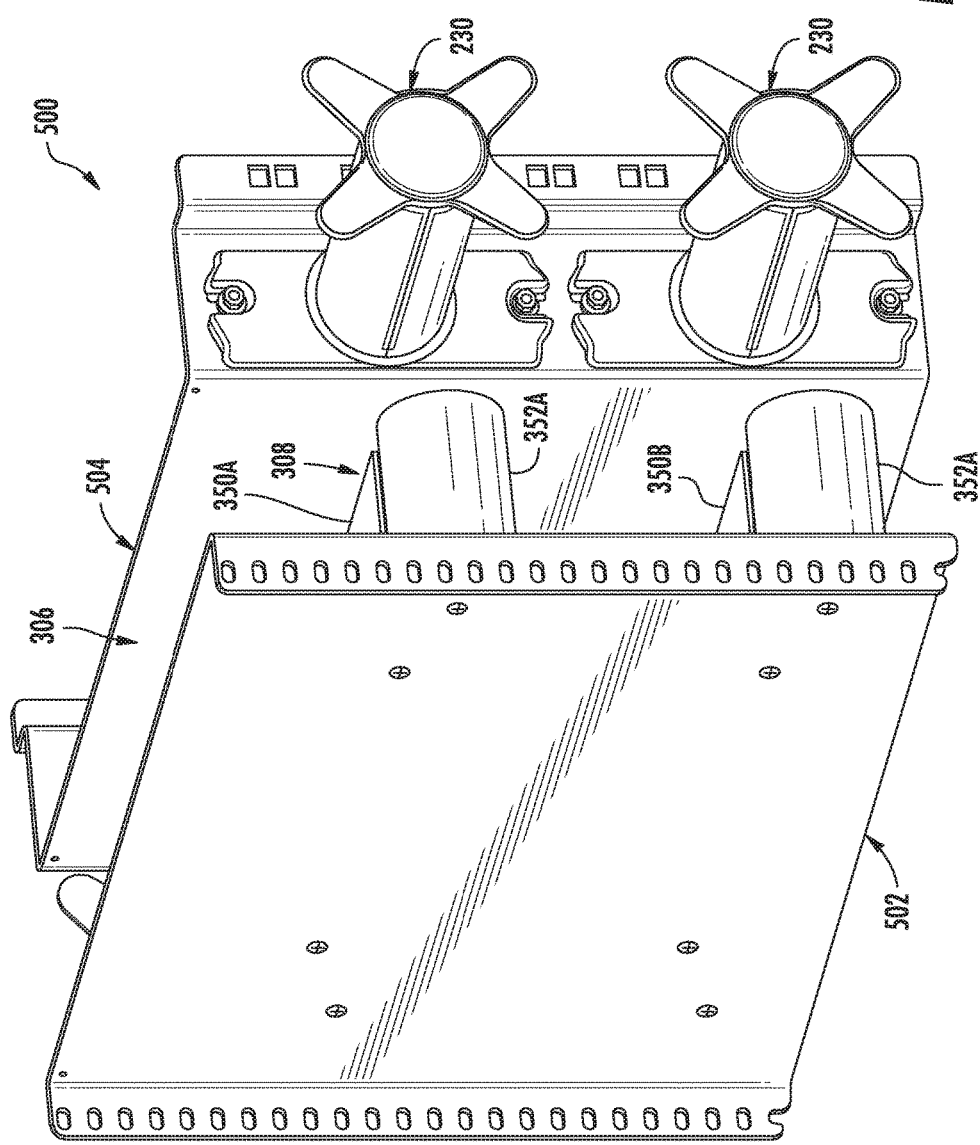

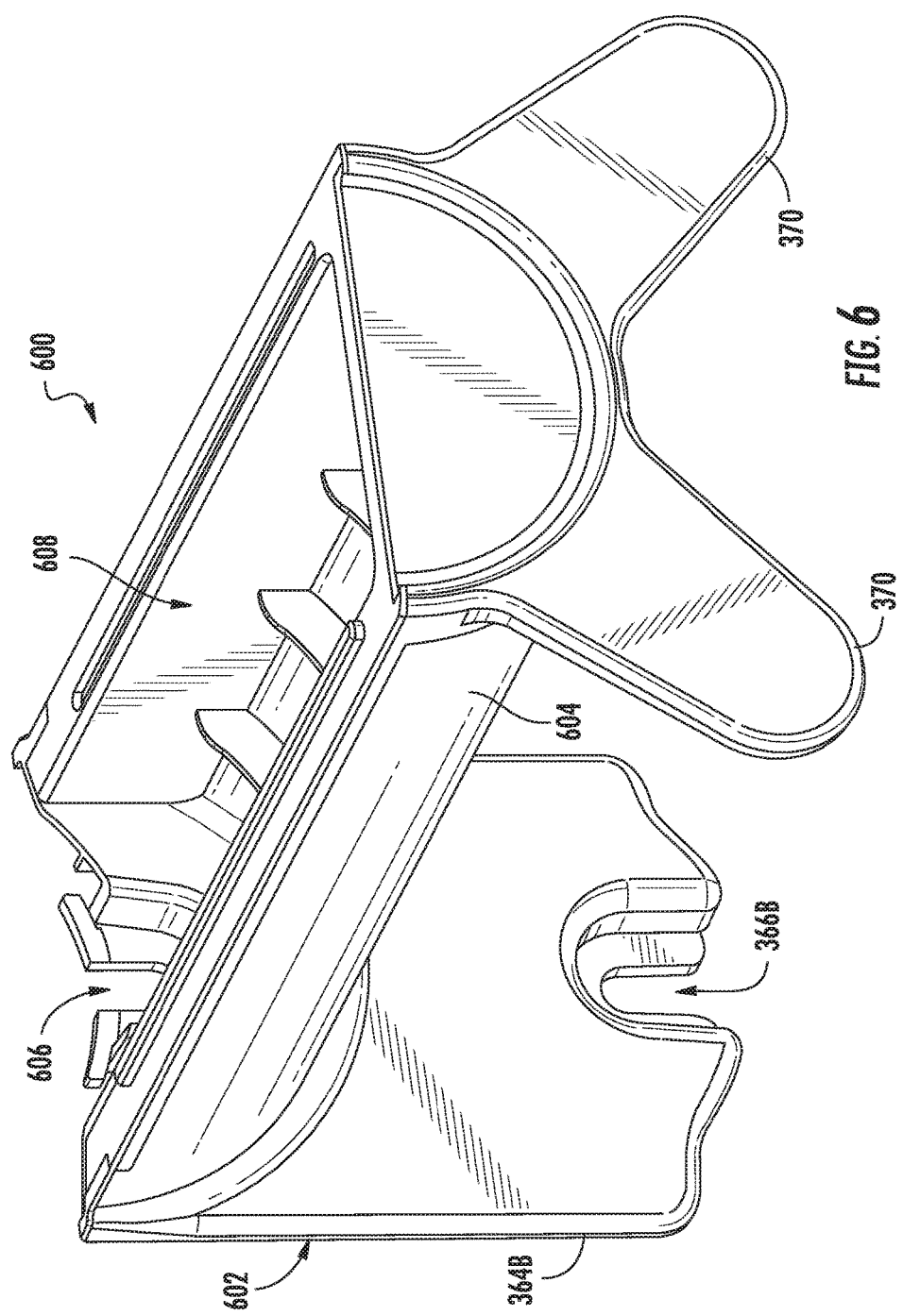

FIBER TERMINAL RACK MOUNT WITH FRONT-TO-BACK FIBER ROUTING MANAGEMENT

CROSS REFERENCE TO RELATED APPLICATIONS

This application claims the benefit of priority of U.S. Provisional Application Ser. No. 62/417,639, filed Nov. 4, 2016, the content of which is relied upon and incorporated herein by reference in its entirety.

BACKGROUND

The disclosure relates generally to fiber optic equipment that includes fiber routing management, and more particularly to a fiber terminal rack mount with front-to-back fiber routing management which can be installed in a fiber terminal rack of a fiber terminal cabinet to provide fiber routing management.

To improve network performance, communication and data networks are increasingly employing optical fiber. The benefits of optical fiber are well known and include higher signal-to-noise ratios and increased bandwidth. To further improve network performance, fiber optic networks are increasingly providing optical fiber connectivity all the way to end subscribers. These initiatives include various fiber-to-the-premises (FTTP), fiber-to-the-home (FTTH), and other fiber initiatives (generally described as FTTx).

A fiber optic network provides optical signals over a distribution network comprised of fiber optic cables. Optical signals may be carried over fiber optic cables to end subscribers via remote terminals. A remote terminal, as used herein, is a device used in fiber optic distribution networks that may convert between optical and electrical signals and/or provide high density fiber termination optical cross-connect for routing optical signals.

FIG. 1 is a schematic diagram of an exemplary optical network that includes remote terminals for converting electrical signals to optical signals, and vice versa, and for carrying optical signals over a fiber optic network. The fiber optic network 100 in FIG. 1 provides optical signals from switching points 102 over a distribution network 104 comprising fiber optic feeder cables 106. The switching points 102 include optical line terminals (OLTs) or forward lasers/return receivers 108 that convert electrical signals to and from optical signals. The optical signals may then be carried over the fiber optic feeder cables 106 to remote terminals 110. The remote terminals 110 act as consolidation points for splicing and making cross-connections and interconnections, as well as providing locations for couplers and splitters. The couplers and splitters in the remote terminals 110 enable a single optical fiber to serve multiple subscriber premises 112. Distribution cables 114 (e.g., optical and/or electrical) exit the remote terminals 110 to carry optical signals between the fiber optic network 100 and the subscriber premises 112. Typical subscriber premises 112 include single-dwelling units (SDU), multi-dwelling units (MDU), businesses, and/or other facilities or buildings. End subscribers in the subscriber premises 112 may contain network devices configured to receive electrical signals as opposed to optical signals. Thus, if the distribution cables 114 are optical cables, then optical network terminals (ONTs) and/or optical network units (ONUs) may be provided at the subscriber premises 112 to convert optical signals received over the distribution cables 114 to electronic signals. The distribution cables 114 leaving the remote terminals 110 can be run to one or more network interface devices (NIDs) for further routing and distribution to subscriber premises 112. The remote terminals 110 may convert between optical and electrical signals and/or provide high density fiber termination optical cross-connect for routing optical signals. In particular, remote terminals 110 contain high density termination housings that terminate one or more fiber optic cables (e.g., feeder cables 106).

A remote terminal comprises a remote terminal cabinet containing high density termination housings that terminate one or more fiber optic cables. Routing of the high termination density housings can be complicated, particularly for high density termination housings oriented in a back-to-back orientation (which requires jumper management between the front and rear facing fiber termination housings). While there is an increased demand for higher density fiber termination within the fiber termination housings, there is also limited right of way space regarding the location of these remote terminal cabinets.

Accordingly, there is a desire to minimize the size and footprint of the remote terminal cabinet and maximize the density fiber termination contained therein, particularly for fiber termination housings in a back-to-back orientation.

SUMMARY

Embodiments of the disclosure are directed to a fiber terminal rack mount with front-to-back fiber routing management. The fiber terminal rack mount is configured to be mounted in a remote terminal to facilitate fiber management of fiber optic cables routed from fiber optic equipment. In exemplary aspects disclosed herein, the fiber terminal rack mount comprises two vertically oriented panels with a plurality of horizontally oriented shelves positioned therebetween. The panels are configured to mount to vertical rails of a remote terminal cabinet of the remote terminal, with oppositely facing fiber optic equipment also mounted in the remote terminal cabinet. The panels and shelves also define routing channels (e.g., pass through channels) for routing fiber optic cables (e.g., fiber jumpers) therethrough, thereby facilitating front-to-back fiber routing between the front and back of the fiber optic equipment mounted in the remote terminal. In this manner, as an example, the fiber terminal rack mount may more easily support fiber routing between the back-to-back mounted fiber optic equipment, which may increase as fiber optic connectivity density increases. In other non-limiting embodiments, the fiber terminal rack mount further comprises fiber routing hubs disposed on each end of the rack mount to aid in routing fiber optic cables.

One embodiment of the disclosure relates to a fiber terminal rack mount for mounting fiber optic equipment in a fiber terminal rack having a front vertical rail set at a front of the fiber terminal rack and a back vertical rail set at a back of the fiber terminal rack. The fiber terminal rack mount comprises a rack attachment panel, chassis attachment panel, and at least one attachment member. The rack attachment panel comprises first and second rack attachment flanges vertically oriented at opposite ends of the rack attachment panel. The rack attachment panel is configured for the first rack attachment flange to attach to at least one front vertical rail of the front vertical rail set of the fiber terminal rack and the rack attachment panel is also configured for the second rack attachment flange to attach to at least one back vertical rail of the back vertical rail set of the fiber terminal rack. The chassis attachment panel comprises at least one chassis attachment flange vertically oriented at an end of the chassis attachment panel. The at least one chassis attachment flange is configured to attach to a first fiber optic equipment chassis facing a first direction. The at least one attachment member is positioned between the rack attachment panel and the chassis attachment panel. The at least one attachment member attaches the rack attachment panel and the chassis attachment panel to one another by a separation distance. The rack attachment panel and the chassis attachment panel at least partially define a routing space between the rack attachment panel and the chassis attachment panel. The routing space is configured to receive and route therein at least a portion of a fiber optic cable between the front and back of the fiber terminal rack.

An additional embodiment of the disclosure relates to a method for routing fiber optic equipment mounted in a fiber terminal rack having a front vertical rail set at a front of the fiber terminal rack and a back vertical rail set at a back of the fiber terminal rack. The method comprises connecting a first end of a first fiber optic cable to a first port housed within a first fiber optic equipment chassis. The first fiber optic equipment chassis is at least partially mounted to the fiber terminal rack by attachment to a chassis attachment panel of a fiber terminal rack mount. The fiber terminal rack mount is attached by first and second rack attachment flanges of a rack attachment panel to a front vertical rail of the front vertical rail set and a back vertical rail of the back vertical rail set of the fiber terminal rack. The method further comprises routing the first fiber optic cable from the front to the back of the fiber terminal rack through a routing space at least partially defined by a separation distance between the chassis attachment panel of the fiber terminal rack. The chassis attachment panel is attached to the fiber terminal rack by at least one attachment member positioned therebetween. The method further comprises connecting a second end of the first fiber optic cable to a second port positioned towards the back of the fiber terminal rack relative to the first port.

An additional embodiment of the disclosure relates to a remote terminal system. The remote terminal system comprises a remote terminal cabinet defining a chamber, a fiber terminal rack, fiber optic equipment, and a fiber terminal rack mount. The fiber terminal rack is positioned within the chamber of the remote terminal cabinet. The fiber terminal rack has a front vertical rail set at a front of the fiber terminal rack and a back vertical rail set at a back of the fiber terminal rack. The fiber optic equipment comprises a front chassis, back chassis, and a first fiber optic cable. The front chassis is positioned at the front of the fiber terminal rack and comprises a first front port. The back chassis is positioned at the back of the fiber terminal rack and comprises a first back port. The first fiber optic cable connects the first front port in the front chassis to the first back port in the back chassis. The fiber terminal rack mount comprises a rack attachment panel, a chassis attachment panel, and at least one attachment member. The rack attachment panel comprises first and second rack attachment flanges vertically oriented at opposite ends of the rack attachment panel. The first rack attachment flange is attached to at least one front vertical rail of the front vertical rail set of the fiber terminal rack and the second rack attachment flange is attached to at least one back vertical rail of the back vertical rail set of the fiber terminal rack. The chassis attachment panel comprises first and second chassis attachment flanges vertically oriented at opposing ends of the chassis attachment panel. The first chassis attachment flange is attached to the front chassis and the second chassis attachment flange is attached to the back chassis. The at least one attachment member is positioned between the rack attachment panel and the chassis attachment panel. The at least one attachment member attaches the rack attachment panel and the chassis attachment panel to one another by a separation distance. The rack attachment panel and the chassis attachment panel at least partially define a routing space between the rack attachment panel and the chassis attachment panel, where at least a portion of the first fiber optic cable is positioned within the routing space.

An additional embodiment of the disclosure relates to a fiber terminal rack mount for mounting fiber optic equipment in a fiber terminal rack having a front and a back. The fiber terminal rack mount comprises a rack attachment panel, a chassis attachment panel, at least one attachment member, and a fiber routing hub. The rack attachment panel comprises at least one rack attachment flange vertically oriented at an end of the rack attachment panel. The at least one rack attachment flange is configured to attach to the fiber terminal rack. The chassis attachment panel comprises at least one chassis attachment flange vertically oriented at an end of the chassis attachment panel. The at least one chassis attachment flange comprises at least one chassis attachment aperture configured to attach to a first fiber optic equipment chassis facing a first direction. The at least one attachment member is positioned between the rack attachment panel and the chassis attachment panel. The at least one attachment member attaches the rack attachment panel and the chassis attachment panel to one another by a separation distance. The fiber routing hub comprises a first end and a second end, the first end attached to the chassis attachment panel. The rack attachment panel and the chassis attachment panel at least partially define a routing space between the rack attachment panel and the chassis attachment panel. The routing space is configured to receive and route therein at least a portion of a fiber optic cable between the front and back of the fiber terminal rack. The fiber routing hub is positioned between the routing space and the at least one chassis attachment aperture of the at least one chassis attachment flange.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiments, and together with the description serve to explain principles and operation of the various embodiments.

BRIEF DESCRIPTION OF THE DRAWINGS

FIG. 5 is a perspective view of another embodiment of the fiber terminal rack mount of FIG. 4A with a reduced height; and FIG. 6 is a perspective view of another embodiment of a fiber routing hub of the fiber terminal rack mount of FIGS. 2B-5, the fiber routing hub comprising a partially curved sidewall.

DETAILED DESCRIPTION

Embodiments of the disclosure are directed to a fiber terminal rack mount with front-to-back fiber routing management. The fiber terminal rack mount is configured to be mounted in a remote terminal to facilitate fiber management of fiber optic cables routed from fiber optic equipment. In exemplary aspects disclosed herein, the fiber terminal rack mount comprises two vertically oriented panels with a plurality of horizontally oriented shelves positioned therebetween. The panels are configured to mount to vertical rails of a remote termination cabinet of the remote terminal, with oppositely facing fiber optic equipment also mounted in the remote terminal cabinet. The panels and shelves also define routing channels (e.g., pass through channels) for routing fiber optic cables (e.g., fiber jumpers) therethrough, thereby facilitating front-to-back fiber routing between the front and back of the fiber optic equipment mounted in the remote terminal. In this manner, as an example, the fiber terminal rack mount may more easily support fiber routing between the back-to-back mounted fiber optic equipment, which may increase as fiber optic connectivity density increases. In other non-limiting embodiments, the fiber terminal rack mount further comprises fiber routing hubs disposed on each end of the rack mount to aid in routing fiber optic cables.

Figure 1:
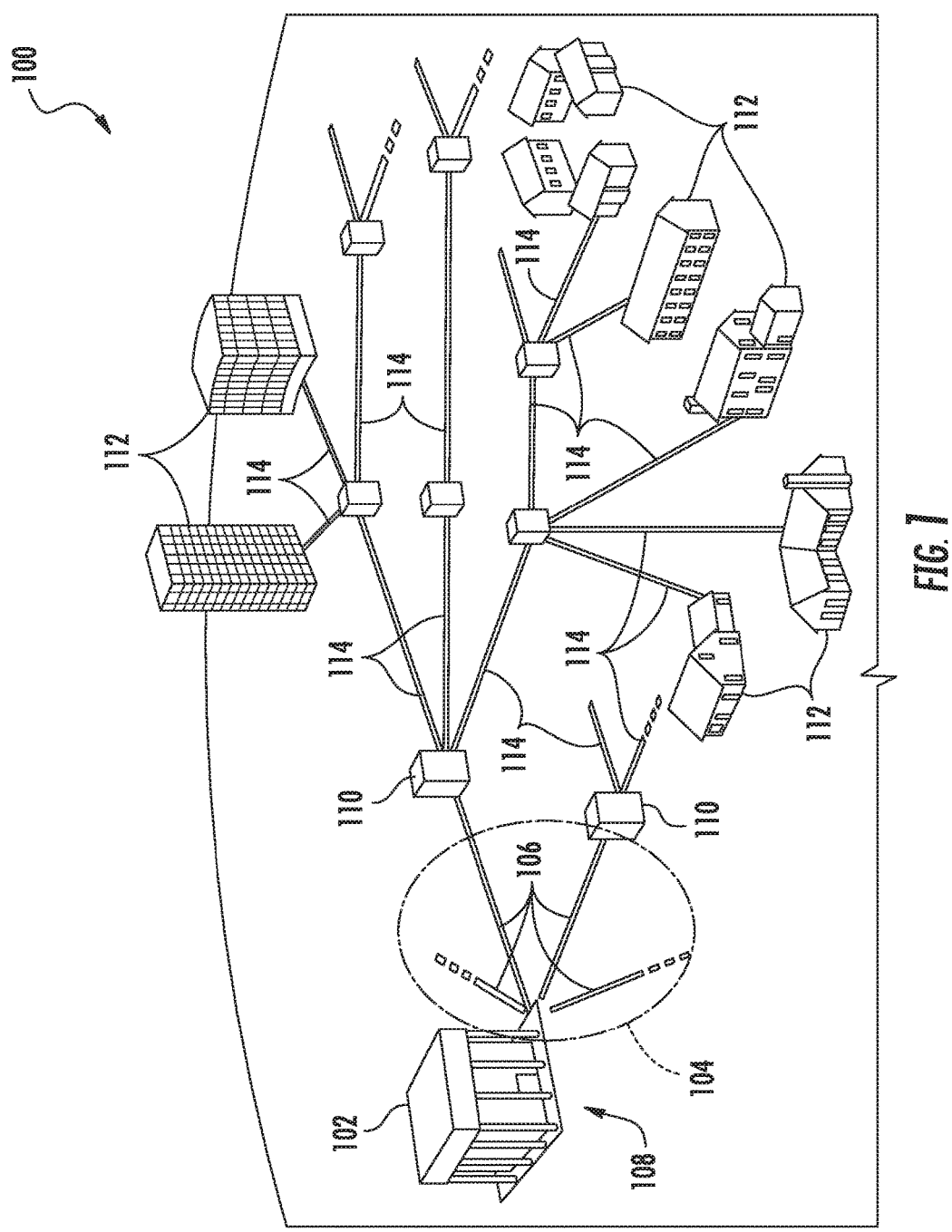
FIG. 1 is a schematic diagram of an exemplary optical network that includes remote terminals for supporting fiber optic equipment for converting electrical signals to optical signals, and vice versa, and for distributing such optical signals over a fiber optic network.
Figure 2A:
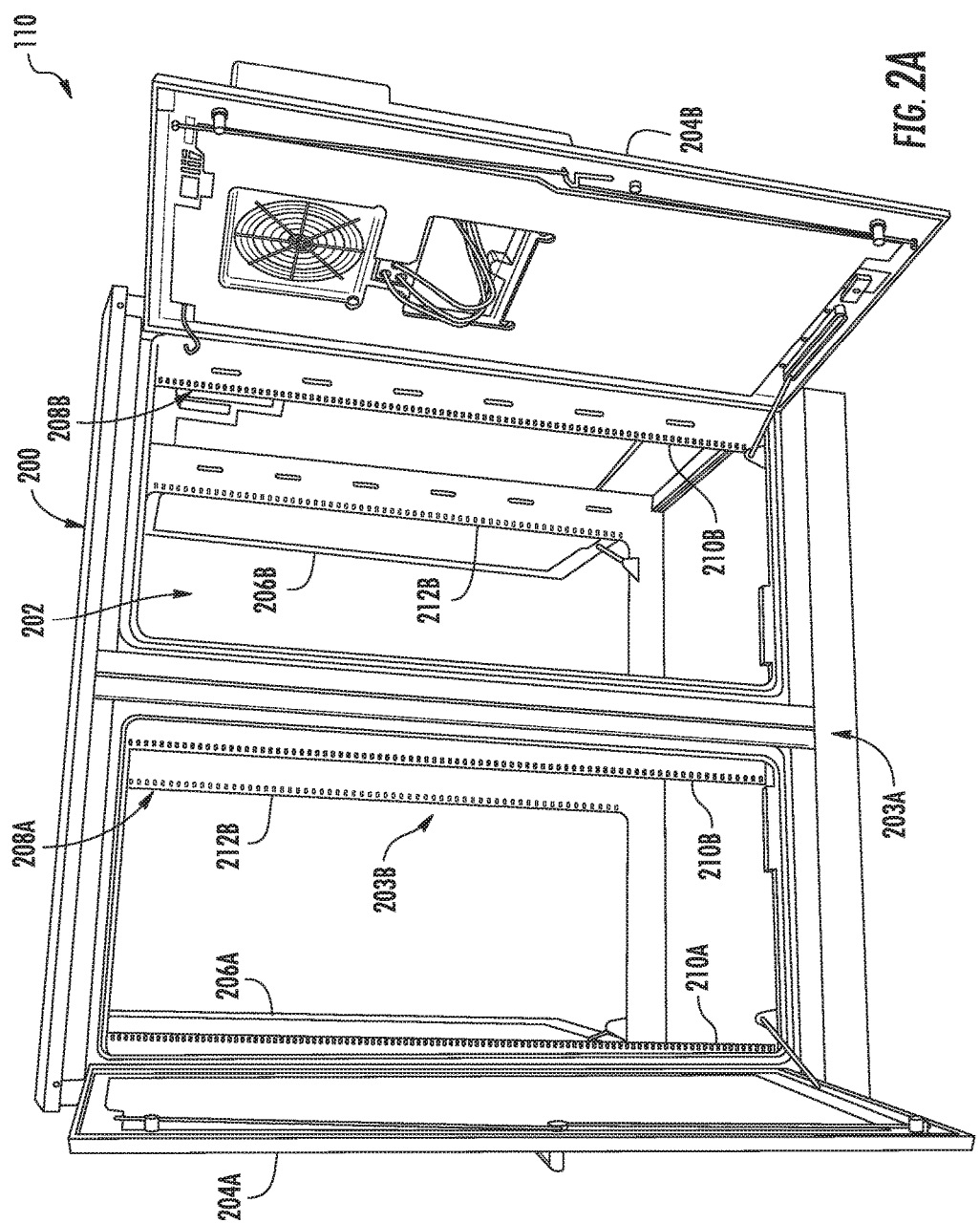
FIG. 2A is a perspective view of an exemplary remote terminal cabinet of an exemplary remote terminal that can be provided in the optical network in FIG. 1, wherein the remote terminal cabinet defines a chamber and comprising a plurality of doors, a left fiber terminal rack positioned within a left portion of the chamber, and a right fiber terminal rack positioned within a right portion of the chamber.

FIG. 2A is a perspective view of an exemplary remote terminal cabinet 200 of the remote terminal 110 of FIG. 1. The remote terminal cabinet 200 defines a chamber 202 and has a front 203A and a back 203B (e.g., rear). The remote terminal cabinet 200 comprises a plurality of doors (e.g., left front door 204A, right front door 204B, left back door 206A, right back door 206B), a left fiber terminal rack 208A positioned within a left portion of the chamber 202, and a right fiber terminal rack 208B positioned within a right portion of the chamber 202. The remote terminal cabinet 200 is configured to provide a convenient and environmentally protected housing to house fiber optic equipment mounted therein. The remote terminal cabinet 200 may also include other supporting components and features for fiber optic equipment mounted therein, such as fans and/or other cooling equipment to provide temperature control (e.g., cooling) and/or operating components, such as power supplies, for providing power to active components of the fiber optic equipment mounted therein.

The left front door 204A of the remote terminal cabinet 200 provides access to a front of the left fiber terminal rack 208A. The left back door 206A of the remote terminal cabinet 200 provides access to a back of the left fiber terminal rack 208A. The right front door 204B provides access to a front of the right fiber terminal rack 208B, and the right back door 206B provides access to a back of the right fiber terminal rack 208B. Each of the left fiber terminal rack 208A and right fiber terminal rack 208B comprises a plurality of vertical rails for mounting termination housings thereto. More specifically, each of the left fiber terminal rack 208A and right fiber terminal rack 208B comprises a left front rail 210A, a right front rail 210B, a left back rail 212A (shown in FIG. 2B), and a right back rail 212B, which may each comprise one or more apertures (e.g., holes, slots, etc.) for mounting thereto. Accordingly, the left and right front vertical rails 210A, 210B could be part of a front vertical rail set, and the left and right back vertical rails 212A, 212B could be part of a back vertical rail set. However, each vertical rail set could only include one of the rails.

Figure 2B:
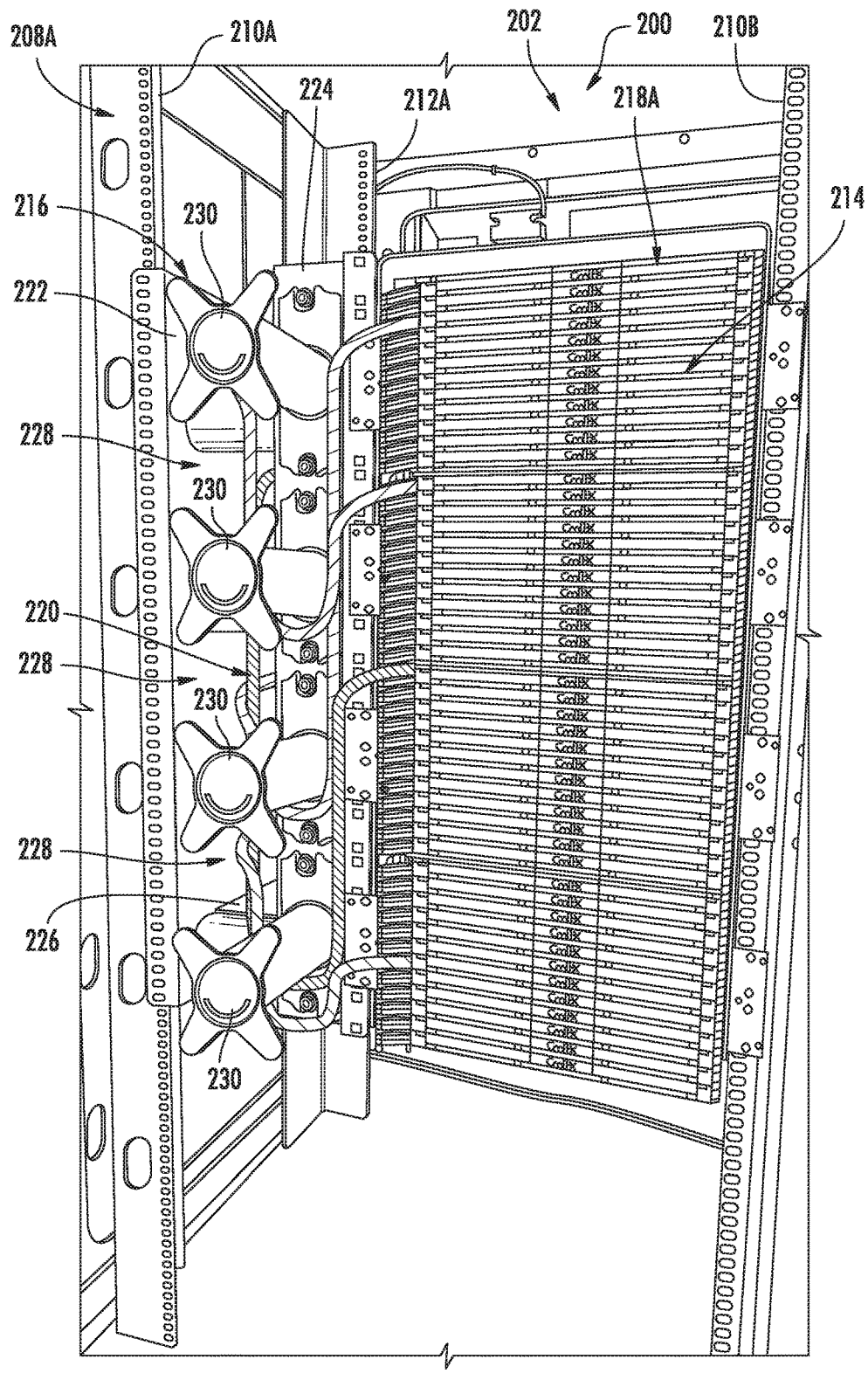
FIG. 2B is a perspective view of an exemplary fiber terminal rack mount partially mounting exemplary fiber optic equipment to the left fiber terminal rack within the chamber of the remote terminal cabinet of FIG. 2A, wherein the fiber terminal rack mount comprises two vertically oriented panels with a plurality of horizontally oriented shelves positioned therebetween to provide front-to-back fiber routing management for the fiber optic equipment, wherein the fiber optic equipment includes a front plurality of fiber optic equipment chassis and a back plurality of fiber optic equipment chassis and a plurality of fiber optic cables connecting the front plurality of fiber optic equipment chassis and back plurality of fiber optic equipment chassis with a portion of the plurality of fiber optic cables routed through the fiber terminal rack.

In this regard, FIG. 2B is a perspective view of fiber optic equipment 214 (including front and back fiber optic equipment) partially mounted to the left fiber terminal rack 208A within the chamber 202 of the remote terminal cabinet 200 of FIG. 2A by a fiber terminal rack mount 216. Fiber optic equipment 214 may include cables, chassis, fiber optic modules, fiber optic cassettes, fiber optic panels, fiber optic adapters, splitters, couplers, etc. The fiber optic equipment 214 comprises a plurality of front chassis 218A (e.g., fiber optic equipment chassis, termination housing, first chassis, etc.), a plurality of back chassis 218B (e.g., fiber optic equipment chassis, termination housing, second chassis, etc.) (shown in FIGS. 4B-4C), and a plurality of fiber optic cables 220 connecting one of the plurality of front chassis 218A and the plurality of back chassis 218B with a portion of the plurality of fiber optic cables 220 routed through the fiber terminal rack mount 216 (discussed below in more detail).

As explained below in more detail, the fiber terminal rack mount 216 provides high density fiber termination optical cross-connect for routing optical signals, provides fiber routing management, and mounts the plurality of front and back chassis 218A, 218B to a fiber terminal rack 208A, 208B. The fiber terminal rack mount 216 may be configured to mount new fiber optic equipment into preexisting fiber terminal racks 208A, 208B. For example, the fiber terminal rack mount 216 can be used to mount chassis 218A, 218B that have a width smaller than that of the fiber terminal rack 208A, 208B (e.g., a standard 23 inch width fiber terminal rack 208A, 208B with a 12 inch width chassis 218A, 218B). More specifically, in exemplary aspects disclosed herein, the fiber terminal rack mount 216 comprises a rack attachment panel 222 and a chassis attachment panel 224 with a plurality of horizontally oriented shelves 226 positioned therebetween. The rack attachment panel 222 is attached to the left front rail 210A and the left back rail 212A. The rack attachment panel 222, chassis attachment panel 224, and a plurality of shelves 226 collectively define a plurality of routing channels 228 (e.g., pass through channels) for routing fiber optic cables (e.g., fiber jumpers) therethrough, thereby facilitating front-to-back fiber routing. As shown, the plurality of front chassis 218A are mounted to the right front rail 210B, and the plurality of front chassis 218A are mounted to the left front rail 210A by the fiber terminal rack mount 216. Further, fiber optic cables 220 connected to the plurality of front chassis 218A are routed through the routing channels 228 of the fiber terminal rack mount 216 to the plurality of back chassis 218B. In this manner, as an example, the fiber terminal rack mount 216 may more easily support fiber routing between the back-to-back mounted fiber optic equipment 214, which may increase as fiber optic connectivity density increases. Further, the fiber terminal rack mount 216 comprises a plurality of fiber routing hubs 230 disposed on each end of the fiber terminal rack mount 216 to aid in routing the fiber optic cables 220.

The fiber terminal rack mount 216 is configured to have a 16U height, but could be configured for other heights. The plurality of front and back chassis 218A, 218B are 4U units, but any other sized chassis could be used (e.g., 1U, 2U, etc.) depending on networking requirements and needs. The designation "U", as used herein, refers to a standard equipment shelf size of a fiber optic equipment rack or a cabinet. This may also be referred to as "RU." For example, an equipment rack may support 1U-sized shelves, with "U" equal to a standard 1.75 inches in height. Typically, the more rack space (the more "U"s) a fiber optic housing takes up, the higher the fiber capacity in the fiber optic housing.

Figure 3A:
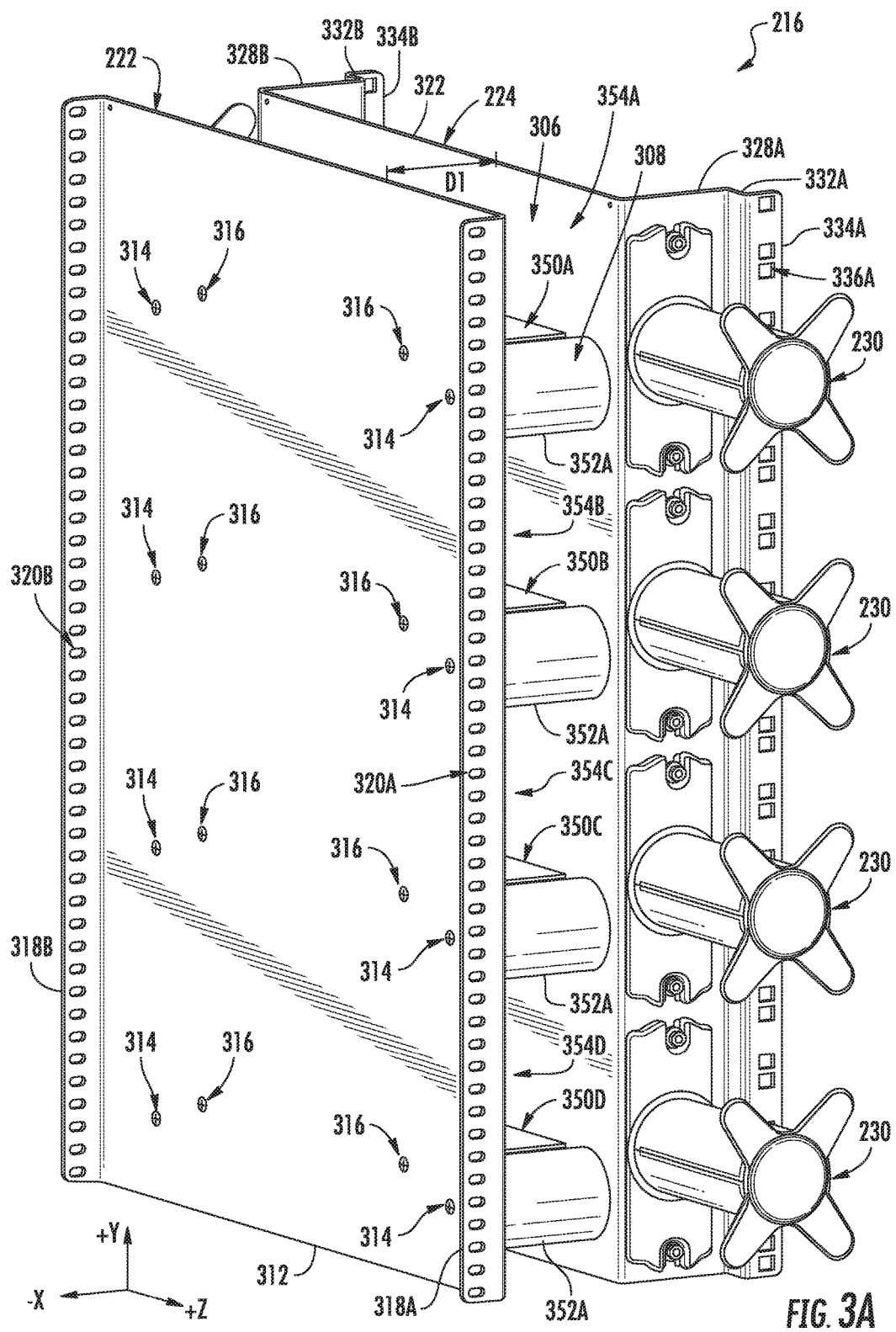
FIG. 3A is a left perspective view of the fiber terminal rack mount of FIG. 2B, wherein the fiber terminal rack mount comprises a rack attachment panel, a chassis attachment panel, a plurality of attachment members positioned therebetween, the rack attachment panel and the chassis attachment panel defining a routing space between the rack attachment panel and chassis attachment panel.
Figure 3B:
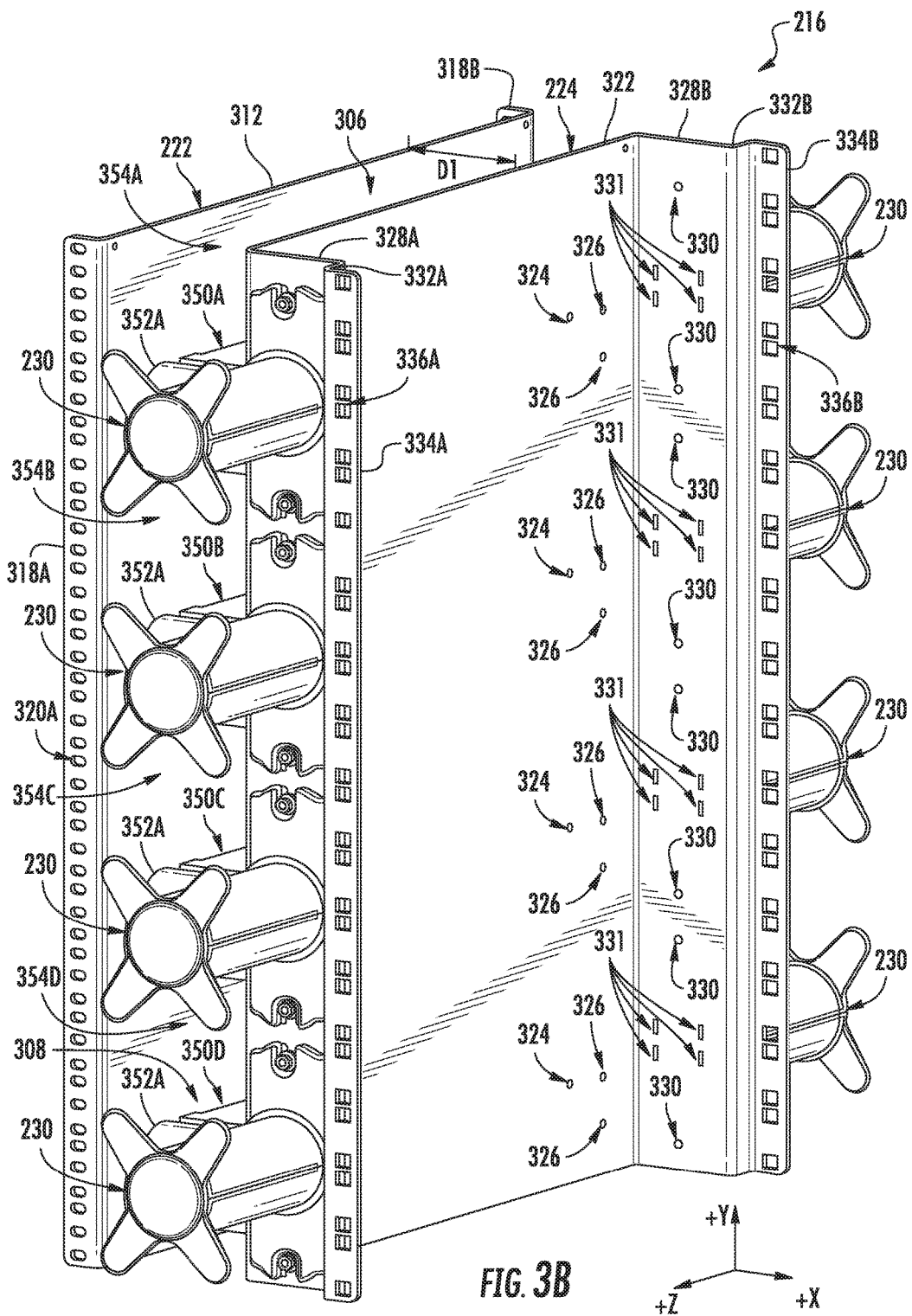
FIG. 3B is a right perspective view of the fiber terminal rack mount of FIG. 3A.
Figure 3C:
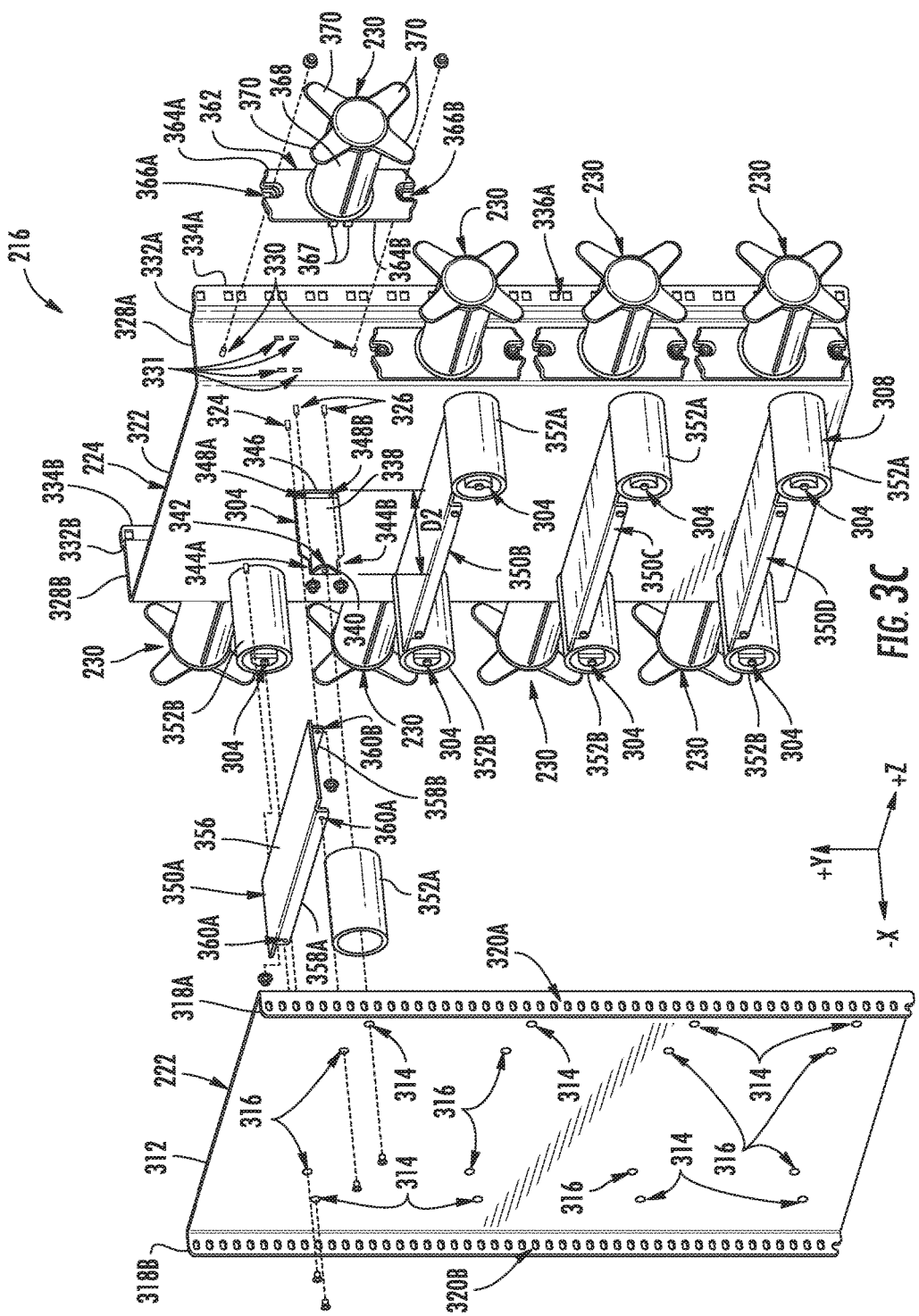
FIG. 3C is an exploded perspective view of the fiber terminal rack mount of FIG. 3A.

To further illustrate and explain the fiber terminal rack mount 216 with front-to-back fiber routing management, FIGS. 3A-3C are provided to illustrate views of the fiber terminal rack mount 216 of FIG. 2B. The fiber terminal rack mount 216 comprises a rack attachment panel 222, a chassis attachment panel 224, and a plurality of attachment members 304 positioned therebetween that attach the rack attachment panel 222 to the chassis attachment panel 224. The fiber terminal rack mount 216 further comprises a routing space 306 defined between the rack attachment panel 222 and the chassis attachment panel 224, a routing management assembly 308 positioned within the routing space 306 (e.g., between the rack attachment panel 222 and the chassis attachment panel 224), and a plurality of fiber routing hubs 230 attached to the chassis attachment panel 224. The rack attachment panel 222 is configured for attachment to a fiber terminal rack 208A, 208B, and the chassis attachment panel 224 is configured for attachment to front and back chassis 218A, 218B (e.g., in a back-to-back configuration).

The rack attachment panel 222 (e.g., made of metal) comprises a body 312 with a plurality of attachment mount apertures 314 and a plurality of shelf mount apertures 316 defined therein, which are discussed in more detail below. The rack attachment panel 222 further comprises a front rack attachment flange (e.g., a first rack attachment flange) 318A and a back rack attachment flange (e.g., a second rack attachment flange) 318B at opposite ends of the rack attachment panel 222 and extending in the same direction (e.g., −X direction) so that the front and back rack attachment flanges 318A, 318B are configured to abut mounting surfaces of front and back vertical rails 210A, 210B, 212A, 212B of the fiber terminal racks 208A, 208B. The front rack attachment flange 318A and back rack attachment flange 318B are vertically oriented (e.g., extending from a top of the body 312 to a bottom of the body 312) so that the front and back rack attachment flanges 318A, 318B are configured to abut mounting surfaces of front and back vertical rails 210A, 210B, 212A, 212B of the fiber terminal racks 208A, 208B. The front rack attachment flange 318A comprises a plurality of front rack attachment apertures 320A (e.g., hole, slot, etc.) to attach the front rack attachment flange 318A to a rail of the remote terminal cabinet 200 (e.g., left front rail 210A, right front rail 210B, left back rail 212A, right back rail 212B). The back rack attachment flange 318B comprises a plurality of back rack attachment apertures 320B (e.g., hole, slot, etc.) to attach the back rack attachment flange 318B to a rail of the remote terminal cabinet 200 (e.g., left front rail 210A, right front rail 210B, left back rail 212A, right back rail 212B). In certain embodiments, the plurality of rack attachment apertures 320A, 320B are vertically spaced along a length of the front and back rack attachment flanges 318A, 318B, respectively so that at least some of the rack attachment apertures 320A, 320B align with at least some apertures of the vertical rails 210A, 210B, 212A, 212B of the fiber terminal racks 208A, 208B.

The chassis attachment panel 224 (e.g., made of metal) comprises a body 322 with a plurality of attachment mount apertures 324 and a plurality of shelf mount apertures 326 defined therein (discussed in more detail below). The chassis attachment panel 224 further comprises a front mount wall 328A and a back mount wall 328B at opposite ends of the chassis attachment panel 224 and extending in the same direction (e.g., +X direction) so that the plurality of front and back chassis 218A, 218B can be mounted in a back-to-back configuration. The front mount wall 328A and back mount wall 328B are vertically oriented (e.g., extending from a top of the body 322 to a bottom of the body 322) so that the plurality of front and back chassis 218A, 218B can be mounted in a back-to-back configuration. In certain embodiments, the front mount wall 328A and/or back mount wall 328B comprise a plurality of fiber routing hub mount apertures 330 for mounting the plurality of fiber routing hubs 230 (discussed in more detail below). Additionally, in certain embodiments, the front mount wall 328A and/or back mount wall 328B could comprise a plurality of fiber routing hub mount slots 331 for each set of fiber routing hub mount apertures 330 to facilitate alignment of the plurality of fiber routing hubs 230 during mounting (discussed in more detail below). Each set comprises four fiber routing hub mount slots 331, but more or fewer could be used.

In certain embodiments, the chassis attachment panel 224 further comprises a front intermediate wall 332A extending from the front mount wall 328A (at an end opposite from the body 322) to provide an offset depth of the front fiber routing hubs 230 relative to a mounting surface of the plurality of front chassis 218A. The chassis attachment panel 224 further comprises a back intermediate wall 332B extending from the back mount wall 328B (at an end opposite from the body 322) to provide an offset depth of the back fiber routing hubs 230 relative to a mounting surface of the plurality of back chassis 218B. The front intermediate wall 332A and back intermediate wall 332B are vertically oriented (e.g., extending from a top of the body 322 to a bottom of the body 322) and extend outward from a center of the body 322 so that the offset depth of the fiber routing hubs 230 relative to mounting surfaces of the plurality of front and back chassis 218A, 218B is close to the center of the fiber terminal rack mount 216 and the corresponding remote terminal cabinet 200. In this manner, the offset depth can be varied to accommodate fiber routing hubs 230 of different lengths and/or chassis 218A, 218B of different depths. Accordingly, the front intermediate wall 332A and back intermediate wall 332B extend in opposite directions (e.g., away from a center of the body 322). More specifically, the front intermediate wall 332A extends in a +Z direction and the back intermediate wall 332B extends in a −Z direction.

The chassis attachment panel 224 further comprises a front chassis attachment flange 334A extending from the front intermediate wall 332A (at an end opposite from the front mount wall 328A). The chassis attachment panel 224 further comprises a back chassis attachment flange 334B extending from the back intermediate wall 332B (at an end opposite from the back mount wall 328B). The front and back chassis attachment flanges 334A, 334B are configured to abut mounting surfaces of the front and back chassis 218A, 218B to mount the front and back chassis 218A, 218B to the fiber terminal rack mount 216. The front chassis attachment flange 334A and back chassis attachment flange 334B are vertically oriented (e.g., extending from a top of the body 322 to a bottom of the body 322) and extend away from the body 322 in the same direction as the front mount wall 328A and back mount wall 328B (e.g., in the +X direction). In this manner, the front and back chassis attachment flanges 334A, 334B are configured to allow mounting of the front and back chassis 218A, 218B in a back-to-back configuration. The front chassis attachment flange 334A comprises a plurality of chassis attachment apertures 336A (e.g., hole, slot, etc.) to attach the front chassis attachment flange 334A to the plurality of front fiber optic equipment chassis 218A and the back chassis attachment flange 334B comprises a plurality of chassis attachment apertures 336B (e.g., hole, slot, etc.) to attach the back chassis attachment flange 334B to the plurality of back fiber optic equipment chassis 218B (discussed in more detail below).

In certain embodiments, the chassis attachment apertures 336A, 336B are vertically spaced along a length of the front and back chassis attachment flange 334A, 334B, respectively. In this manner, the front rack attachment flange 318A is parallel to, but offset from the front mount wall 328A, and the back rack attachment flange 318B is parallel to, but offset from the back mount wall 328B to provide an offset depth of the front and back fiber routing hubs 230 relative to the front and back chassis 218A, 218B. In this manner, the offset depth can be varied to accommodate fiber routing hubs 230 of different lengths and/or chassis 218A, 218B of different depths. In certain embodiments, the front intermediate wall 332A and the back intermediate wall 332B are omitted. Accordingly, the front rack attachment flange 318A extends from an end of the front mount wall 328A, such that the front rack attachment flange 318A and front mount wall 328A are in the same plane, and similarly, the back rack attachment flange 318B extends from an end of the back mount wall 328B, such that the back rack attachment flange 318B and back mount wall 328B are in the same plane.

The plurality of attachment members 304 (e.g., made of plastic) are positioned between the rack attachment panel 222 and the chassis attachment panel 224, and attaches the rack attachment panel 222 to the chassis attachment panel 224, thereby defining a routing space 306 a separation distance D1 between the rack attachment panel 222 and the chassis attachment panel 224 (e.g., between the rack attachment panel body 312 and the chassis attachment panel body 322). The separation distance D1 correlates with a separation length D2 of the attachment member 304, such that altering a length of the attachment member 304 alters the separation distance D1. The distance (e.g., separation distance D1) between the rack attachment panel 222 and the chassis attachment panel 224 may vary depending on mounting requirements, such as to accommodate chassis of different widths within the same fiber terminal rack 208A, 208B. For example, the separation distance D1 could be increased to mount fiber optic equipment 214 with a decreased width, or the separation distance D1 could be decreased to mount fiber optic equipment 214 with an increased width.

Each of the plurality of attachment members 304 comprises a body 338 with a left tab 340 at a first end of the body 338 and a right tab 346 at a second end of the body 338 opposite the first end of the body 338, which are configured to abut the rack attachment panel 222 and chassis attachment panel 224 for attachment thereto, as explained below. The left tab 340 comprises a mounting aperture 342, a top recess 344A, and a bottom recess 344B. The top recess 344A and bottom recess 344B result in a reduced height of the body 338 at a left side of the body 338 relative to a right side of the body 338. The reduced height may facilitate ease of manufacturing of the attachment member 304 (e.g., tooling clearance for manufacturing the left tab 340) and/or ease of assembly of the fiber terminal rack mount 216 (e.g., tooling clearance for access to fasteners connecting the attachment member 304 to the chassis attachment panel 224). The right tab 346 comprises a top mounting aperture 348A and a bottom mounting aperture 348B, although in certain embodiments only one mounting aperture may be used.

The left tab mounting aperture 342 aligns with the rack attachment panel attachment mount aperture 314, such that a fastener (e.g., screw, washer, threaded standoff, stud, and/or nut, etc.) can be inserted through the left tab mounting aperture 342 and rack attachment panel attachment mount aperture 314 to attach the attachment member 304 and rack attachment panel 222 to each other. The right tab mounting apertures 348A, 348B align with the chassis attachment panel attachment mount apertures 324, such that a fastener (e.g., screw, washer, threaded standoff, stud, and/or nut, etc.) can be inserted through each of the right tab mounting apertures 348A, 348B and chassis attachment panel attachment mount apertures 324 to attach the attachment member 304 and chassis attachment panel 224 to each other. The plurality of right tab mounting apertures 348A, 348B prevents the attachment member 304 from rotating relative to the chassis attachment panel 224. It is noted that the left tab 340 and the right tab 346 could have fewer or more mounting apertures 342, 348A, 348B.

In this manner, the attachment member 304 attaches the rack attachment panel 222 to the chassis attachment panel 224, and provides a separation distance between them, where the separation length extends from the left tab 340 to the right tab 346. In some embodiments, the separation distance between the rack attachment panel 222 and the chassis attachment panel 224 are at least the length of the attachment member 304 (e.g., from the left tab 340 to the right tab 346). Further, it is noted that a plurality of attachment members 304, a plurality of left tab mounting apertures 342, and/or a plurality of right tab mounting apertures 348A, 348B prevents the rack attachment panel 222, the chassis attachment panel 224, and/or the attachment member 304 from rotating relative to one another.

In certain embodiments, when the rack attachment panel 222 is attached to the chassis attachment panel 224 by the attachment member 304, the rack attachment panel front and back rack attachment flanges 318A, 318B extend in a first direction (e.g., −X direction), and the chassis attachment panel front and back chassis attachment flanges 334A, 334B extend in a second direction (e.g., +X direction) opposite the first direction. In other words, the rack attachment panel front and back rack attachment flanges 318A, 318B extend outwardly from the routing space 306, and the chassis attachment panel front and back chassis attachment flanges 334A, 334B extend outwardly from the routing space 306 so that the rack attachment panel 222 can mount to front and back vertical rails (e.g., rails 210A, 210B, 212A, 212B) and front and back chassis 218A, 218B and provide a routing space 306 extending from front to back.

The routing management assembly 308 comprises a plurality of shelves 226 (e.g., first shelf 350A, second shelf 350B, third shelf 350B, fourth shelf 350D) that collectively define a plurality of routing channels 228 (e.g., a first fiber routing channel 354A, a second fiber routing channel 354B, a third fiber routing channel 354C, a fourth fiber routing channel 354D) for fiber routing management (e.g., to receive fiber optic cables 220 through the fiber routing channels 354A, 354B, 354C, 354D). In certain embodiments, the first shelf 350A is positioned towards a top, the second shelf 350B is positioned below the first shelf 350A, the third shelf 350C is positioned below the second shelf 350B, and the fourth shelf 350D is positioned below the third shelf 350C. Each shelf 350A, 350B, 350C, 350D may have associated therewith a front routing cylinder 352A (e.g., hollow cylinder and/or made of plastic) and a back routing cylinder 352B (e.g., hollow cylinder and/or made of plastic) at ends of the self 350A, 350B, 350C, 350D. The shelves 350A, 350B, 350C, 350D collectively define a plurality of routing channels 228, as explained below in more detail.

The shelf 350A, 350B, 350C, 350D comprises a horizontal plate 356 (e.g., made of metal) with a left flange 358A extending downwardly from a left side and a right flange 358B extending downwardly from a right side (opposite the left side). The left flange 358A comprises a plurality of mounting apertures 360A therein (e.g., a first mounting aperture 360A towards a front end of the left flange 358A, and a second mounting aperture 360A towards a back end of the left flange 358A) for attaching the shelf 350A, 350B, 350C, 350D to the rack attachment panel 222. The right flange 358B comprises a plurality of mounting apertures 360B therein (e.g., a first mounting aperture 360B towards a front end of the right flange 358B, and a second mounting aperture 360B towards a back end of the right flange 358B) for attaching the shelf 350A, 350B, 350C, 350D to the chassis attachment panel 224. The shelf left flange mounting aperture 360A aligns with the rack attachment panel shelf mount aperture 316, such that a fastener (e.g., screw, washer, threaded standoff, stud, and/or nut, etc.) can be inserted through the shelf left flange mounting aperture 360A and the rack attachment panel shelf mount aperture 316 to attach the shelf 350A, 350B, 350C, 350D and rack attachment panel 222 to each other. Similarly, the shelf right flange mounting aperture 360B aligns with the chassis attachment panel shelf mount aperture 326, such that a fastener (e.g., screw, washer, threaded standoff, stud, and/or nut, etc.) can be inserted through the shelf right flange mounting aperture 360B and the chassis attachment panel shelf mount aperture 326 to attach the shelf 350A, 350B, 350C, 350D and chassis attachment panel 224 to each other. Additionally, the left and right flanges 358A, 358B provide structural support and stiffness to the horizontal plate 356. The shelf 350A, 350B, 350C, 350D may attach the rack attachment panel 222 to the chassis attachment panel 224 in addition to or instead of the attachment member 304.

The left flange 358A and right flange 358B each extend along a length of the horizontal plate 356. In certain embodiments, the length of the left flange 358A and right flange 358B is less than the length of the horizontal plate 356. In this manner, the front end and/or back end of the horizontal plate 356 extends past ends of the left flange 358A and/or right flange 358B.

The front routing cylinder 352A is positioned around an attachment member 304 at a front end of the shelf 350A, 350B, 350C, 350D, such that the horizontal plate 356 is approximately tangent with an outer surface of the front routing cylinder 352A. This configuration is made possible by the decreased length of the left and right flanges 358A, 358B relative to the length of the horizontal plate 356. In certain embodiments, a height of the attachment member body 338 corresponds in size to the inner diameter of the front routing cylinder 352A to reduce movement of the front routing cylinder 352A relative to the attachment member 304 and/or shelf 350A, 350B, 350C, 350D. For example, the height of the attachment member body 338 could be slightly more than the inner diameter of the front routing cylinder 352A for a friction fit attachment.

Similarly, the back routing cylinder 352B is positioned around an attachment member 304 at a back end of the shelf 350A, 350B, 350C, 350D, such that the horizontal plate 356 is approximately tangent with an outer surface of the back routing cylinder 352B. This configuration is made possible by the decreased length of the left and right flanges 358A, 358B relative to the length of the horizontal plate 356. In certain embodiments, a height of the attachment member body 338 corresponds in size to the inner diameter of the back routing cylinder 352B to reduce movement of the back routing cylinder 352B relative to the attachment member 304 and/or shelf 350A, 350B, 350C, 350D. For example, the height of the attachment member body 338 could be slightly more than the inner diameter of the back routing cylinder 352B for a friction fit attachment.

In certain embodiments, as shown in FIGS. 3A-3C, the routing management assembly 308 comprises a plurality of shelves 350A, 350B, 350C, 350D that define a plurality of fiber routing channels 354A, 354B, 354C, 354D therebetween (e.g., within the routing space 306). Each of the plurality of shelves 350A, 350B, 350C, 350D is oriented horizontally (e.g., extending from a front to a back), and/or vertically aligned. It is noted that more or less shelves 350A, 350B, 350C, 350D and fiber routing channels 354A, 354B, 354C, 354D may be used depending on routing management requirements and preferences. In certain embodiments, a first fiber routing channel 354A is defined by the rack attachment panel body 312, the chassis attachment panel body 322, and the first shelf 350A. A second fiber routing channel 354B is defined by the rack attachment panel body 312, the chassis attachment panel body 322, the first shelf 350A, and the second shelf 350B. A third fiber routing channel 354C is defined by the rack attachment panel body 312, the chassis attachment panel body 322, the second shelf 350B, and the third shelf 350C. A fourth fiber routing channel 354D is defined by the rack attachment panel body 312, the chassis attachment panel body 322, the third shelf 350C, and the fourth shelf 350D. In certain embodiments, the fiber terminal rack mount 216 omits shelves 350A, 350B, 350C, 350D and/or provides alternative front-to-back routing features (e.g., using attachment members 304, studs, etc.).

In certain embodiments, the fiber terminal rack mount 216 comprises a plurality of fiber routing hubs 230 (e.g., a plurality of front fiber routing hubs 230 and a plurality of back fiber routing hubs 230) to organize and manage the fiber optic cables 220. More specifically, the plurality of fiber routing hubs 230 comprise a fiber routing hub 230 horizontally adjacent to (e.g., horizontally offset from) each fiber routing channel 354A, 354B, 354C, 354D (discussed below in more detail), where the cylindrical sidewall 368 of each fiber routing hub 230 could be at least approximately horizontally aligned with the respective shelf 350A, 350B, 350C, 350D. A plurality of front fiber routing hubs 230 are vertically aligned and attached to the front chassis attachment flange 334A (e.g., between the front chassis attachment apertures 336A and the chassis attachment panel body 322, between the front chassis attachment apertures 336A and the routing space 306, between the front chassis attachment apertures 336A and the plurality of fiber routing channels 354A, 354B, 354C, 354D, etc.), and a plurality of back fiber routing hubs 230 are vertically aligned and attached to the back chassis attachment flange 334B (e.g., between the back chassis attachment aperture 336B and the chassis attachment panel body 322, between the back chassis attachment aperture 336B and the routing space 306, between the back chassis attachment aperture 336B and the plurality of fiber routing channels 354A, 354B, 354C, 354D, etc.). However, fewer or more fiber routing hubs 230 could be used. In this manner, the fiber terminal rack mount 216 is configured to provide a fiber routing hub 230 adjacent to each end of each fiber routing channel 354A, 354B, 354C, 354D. This allows a user to adjust slack of fiber optic cables 220 at both ends of the fiber terminal rack mount 216. Further, the plurality of front and back fiber routing hubs 230 are configured to be positioned adjacent to the front and back chassis 218A, 218B to provide a wrapping point for fiber optic cables 220 to organize and manage the fiber optic cables 220.

With continuing reference to FIG. 3C, each of the fiber routing hubs 230 comprises a mounting base 362 with a top portion 364A and a bottom portion 364B. A top slot 366A is defined at a top of the top portion 364A, a bottom slot 366B is defined at a bottom of the bottom portion 364B, and a plurality of mounting tabs 367 extend from a back of the mounting base 362. The fiber routing hub top slot 366A and fiber routing hub bottom slot 366B align with the chassis attachment panel fiber routing hub mount apertures 330 for attachment of the fiber routing hub 230 to the chassis attachment panel 224, such that a fastener (e.g., screw, washer, threaded standoff, stud, and/or nut, etc.) can be inserted through the top slot 366A and chassis attachment panel fiber routing hub mount aperture 330 and a fastener can be inserted through the bottom slot 366B and chassis attachment panel fiber routing hub mount aperture 330. Further, the plurality of mounting tabs 367 (positioned between the top and bottom slots 366A) align with and are inserted into the plurality of fiber routing mount slots 331. Insertion of the plurality of mounting tabs 367 into the fiber routing mount slots 331 facilitates alignment of the fiber routing hub mount apertures 330 with the top and bottom slots 366A, 366B. Two of the four mounting tabs 367 are shown, although more or fewer mounting tabs 367 could be used. In this manner, the fiber routing hub 230 is attached to the chassis attachment panel 224. The open end of the top slot 366A and bottom slot 366B facilitates assembly of the fiber routing hub 230 to the chassis attachment panel 224 by inserting a fastener into the chassis attachment panel 224 and then sliding one of the top slot 366A and bottom slot 366B into position around the fastener.

The fiber routing hub 230 further comprises a cylindrical sidewall 368 extending perpendicularly from a first end of the fiber routing hub 230 to a second end of the fiber routing hub 230. The cylindrical sidewall 368 separates the top portion 364A of the mounting base 362 from the bottom portion 364B of the mounting base 362 and provides a wrapping surface for the fiber optic cables 220. The cylindrical sidewall 368 is of a predetermined size and diameter to ensure that the fiber optic cables 220 do not exceed a minimum bend radius, preventing damage to the fiber optic cables. Each of the fiber routing hubs 230 comprise a plurality of fingers 370 extending perpendicularly at a second end of the fiber routing hub 230 (e.g., the plurality of fingers 370 at least approximately parallel to the mounting base 362). More specifically, the plurality of fingers 370 (e.g., four fingers 370) are circumferentially spaced around a periphery of the cylindrical sidewall 368. Of course, additional or fewer fingers 370 could be used depending on networking requirements and needs. The plurality of fingers 370 keep the fiber optic cables 220 wrapped around the fiber routing hubs 230. Further, the routing space 306 and fiber routing channels 354 extend from the front to the back, and the fiber routing hubs 230 are positioned horizontally offset from the routing space 306 and fiber routing channels 354 (e.g., between the chassis attachment aperture 336A, 336B and the routing space 306, and/or between the chassis attachment aperture 336A, 336B and the fiber routing channels 354). In this manner, as explained in more detail below, the fiber optic cables 220 all generally follow the same wrapping path minimizing crowding of the fiber optic cables 220.

Figure 4A:
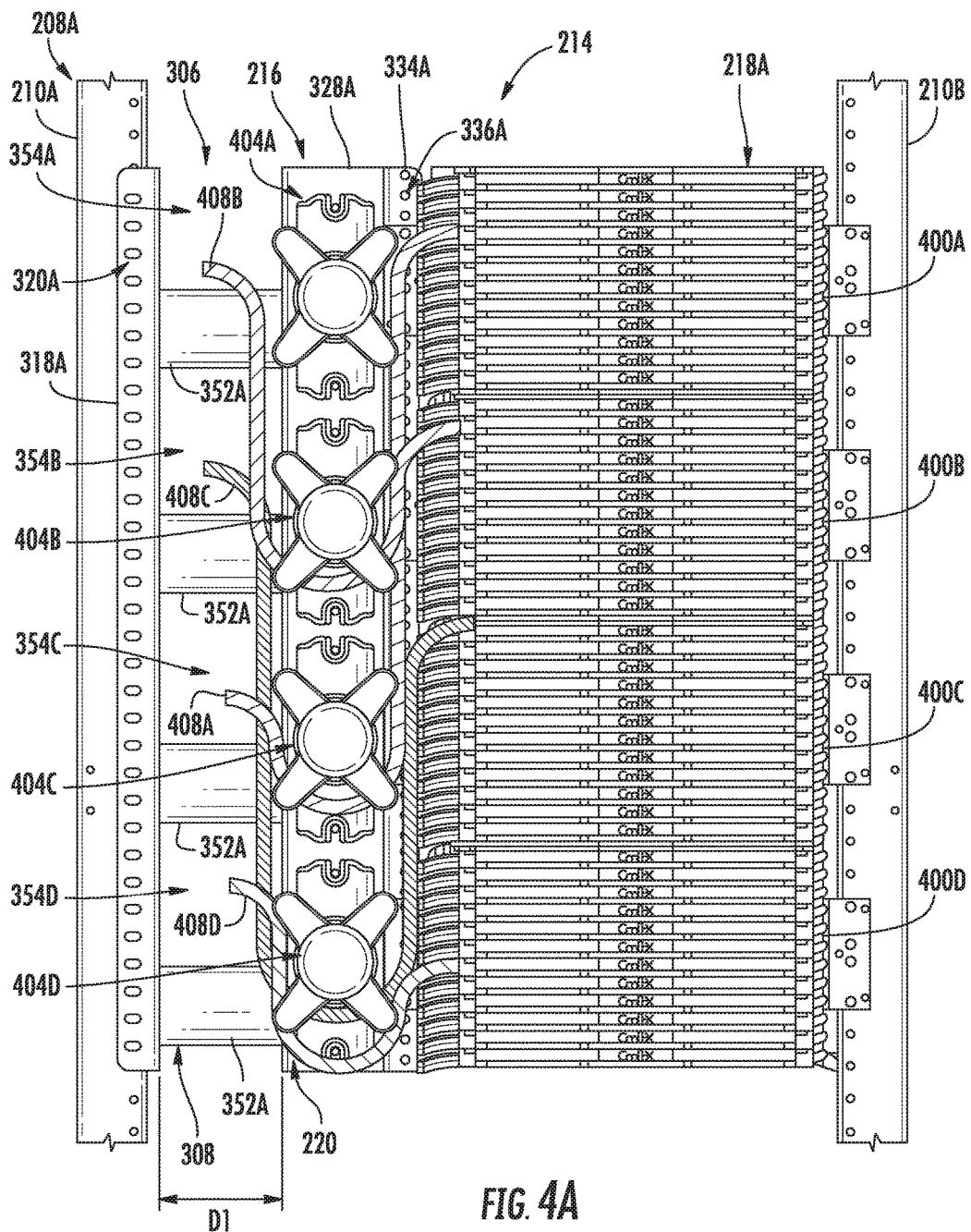
FIG. 4A is a front view of the first fiber optic equipment chassis of FIG. 2B.
Figure 4B:
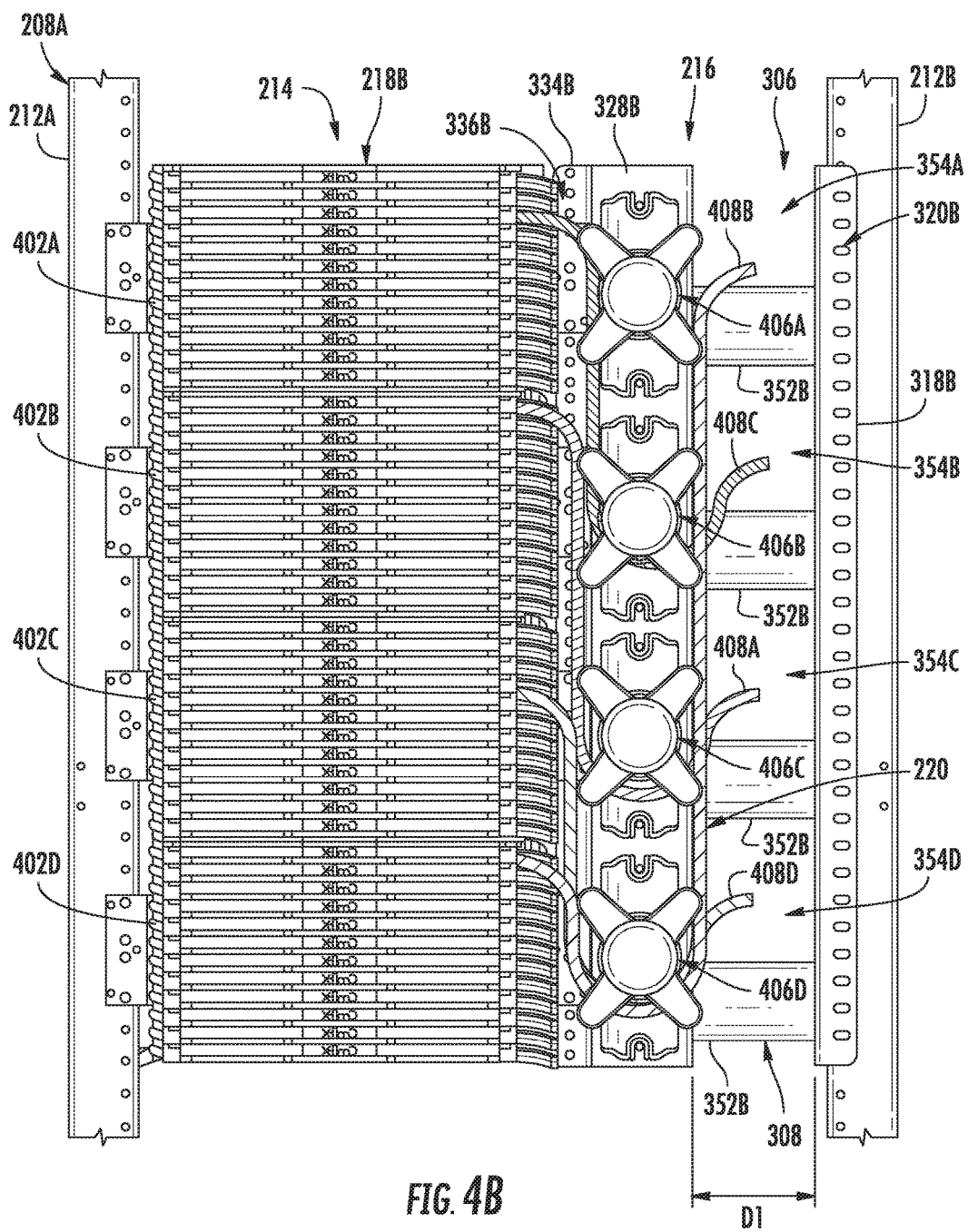
FIG. 4B is a back view of the second fiber optic equipment chassis of FIG. 2B.
Figure 4C:
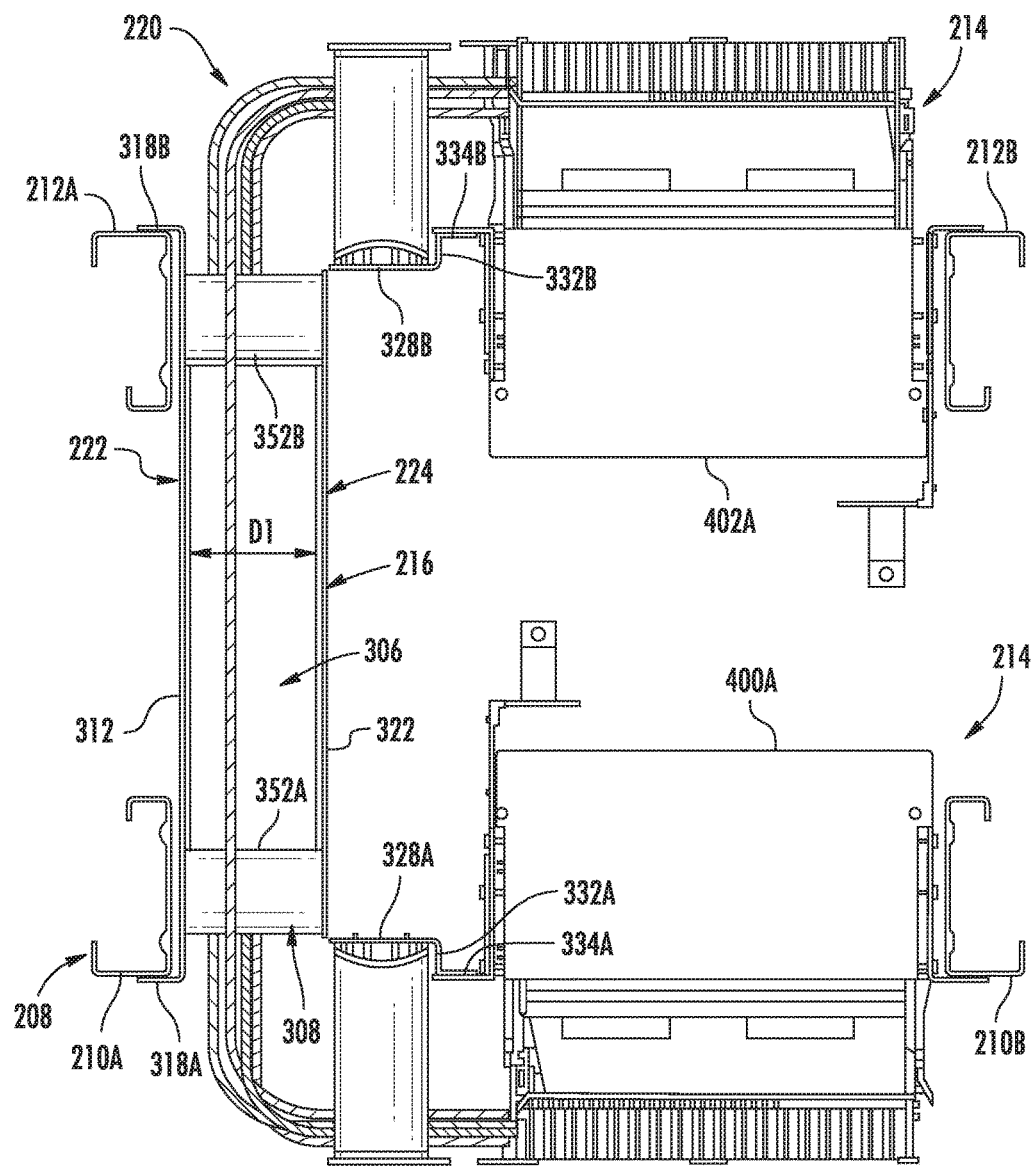
FIG. 4C is a top view of the front plurality of fiber optic equipment chassis, back plurality of fiber optic equipment chassis, fiber optic rack mount, and plurality of fiber optic cables of FIG. 2B.

FIGS. 4A-4C are views of the plurality of front fiber optic equipment chassis 218A, plurality of back fiber optic equipment chassis 218B, fiber terminal rack mount 216, and plurality of fiber optic cables 220 of FIG. 2B. As shown, the front rack attachment flange 318A of the rack attachment panel 222 of the fiber terminal rack mount 216 is attached to the left front rail 210A of the left fiber terminal rack 208A, and the back rack attachment flange 318B of the rack attachment panel 222 of the fiber terminal rack mount 216 is attached to the left back rail 212A of the left fiber terminal rack 208A. The front chassis attachment flange 334A is attached to a left side of each of the plurality of front fiber optic equipment chassis 218A (e.g., by a left L bracket). The right side of each of the plurality of front fiber optic equipment chassis 218A is attached to the right front rail 210B (e.g., by a right L bracket). Similarly, the back chassis attachment flange 334B is attached to a right side of each of the plurality of back fiber optic equipment chassis 218B (e.g., by a right L bracket). The left side of each of the plurality of back chassis 218B is attached to the right back rail 212B (e.g., by a left L bracket). In this manner, each of the plurality of front chassis 218A is attached to the left fiber terminal rack 208A and each of the plurality of back chassis 218B is attached to the left fiber terminal rack 208A. Alternatively, the fiber terminal rack mount 216 could be mounted to the right front rail 210B and the right back rail 212B, such that the front and back chassis 218A, 218B are attached to the left front rail 210A and left back rail 212A. Either way, as shown, the plurality of front chassis 218A, and plurality of back chassis 218B can be set up in a back-to-back configuration.

The plurality of front chassis 218A comprises a first front chassis 400A positioned towards a top of the fiber terminal rack 208, a second front chassis 400B positioned below the first front chassis 400A, a third front chassis 400C positioned below the second front chassis 400B, and a fourth front chassis 400D positioned below the third front chassis 400C. The plurality of back chassis 218B comprises a first back chassis 402A positioned towards a top of the fiber terminal rack 208, a second back chassis 402B positioned below the first back chassis 402A, a third back chassis 402C positioned below the second back chassis 402B, and a fourth back chassis 402D positioned below the third back chassis 402C. Of course, more or fewer chassis could be used depending on networking requirements and needs. The plurality of front chassis 218A and the plurality of back chassis 218B are configured in a back-to-back orientation (shown in FIG. 4C).

As shown, the fiber routing hubs 230 comprise a first front fiber routing hub 404A mounted to the chassis attachment panel front mount wall 328A proximate the first fiber routing channel 354A, a second front fiber routing hub 404B mounted to the chassis attachment panel front mount wall 328A proximate the second fiber routing channel 354B, a third front fiber routing hub 404C mounted to the chassis attachment panel front mount wall 328A proximate the third fiber routing channel 354C, and a fourth front fiber routing hub 404D mounted to the chassis attachment panel front mount wall 328A proximate the fourth fiber routing channel 354D. The first front fiber routing hub 404A is towards a top (e.g., between the first front chassis 400A and the first fiber routing channel 354A, and/or between the first front chassis 400A and the first shelf 350A), the second front fiber routing hub 404B is positioned below the first front fiber routing hub 404A (e.g., between the second front chassis 400B and the second fiber routing channel 354B, and/or between the second front chassis 400B and the second shelf 350B), the third front fiber routing hub 404C is positioned below the second front fiber routing hub 404B (e.g., between the third front chassis 400C and the third fiber routing channel 354C, and/or between the third front chassis 400C and the third shelf 350C), and the fourth front fiber routing hub 404D is positioned below the third front fiber routing hub 404C (e.g., between the fourth front chassis 400D and the fourth fiber routing channel 354D, and/or between the fourth front chassis 400D and the fourth shelf 350D).

Similarly, the fiber routing hubs 230 further comprise a first back fiber routing hub 406A mounted to the chassis attachment panel back mount wall 328B proximate the first fiber routing channel 354A, a second back fiber routing hub 406B mounted to the chassis attachment panel back mount wall 328B proximate the second fiber routing channel 354B a third back fiber routing hub 406C mounted to the chassis attachment panel back mount wall 328B proximate the third fiber routing channel 354C, and a fourth back fiber routing hub 406D mounted to the chassis attachment panel back mount wall 328B proximate the fourth fiber routing channel 354D. The first back fiber routing hub 406A is towards a top (e.g., between the first back chassis 402A and the first fiber routing channel 354A, and/or between the first back chassis 402A and the first shelf 350A), the second back fiber routing hub 406B is positioned below the first back fiber routing hub 406A (e.g., between the second back chassis 402B and the second fiber routing channel 354B, and/or between the second back chassis 402B and the second shelf 350B), the third back fiber routing hub 406C is positioned below the second back fiber routing hub 406B (e.g., between the third back chassis 402C and the third fiber routing channel 354C, and/or between the third back chassis 402C and the third shelf 350C), and the fourth back fiber routing hub 406D is positioned below the third back fiber routing hub 406C (e.g., between the fourth back chassis 402D and the fourth fiber routing channel 354D, and/or between the fourth back chassis 402D and the fourth shelf 350D).

The plurality of fiber optic cables 220 comprises a first fiber optic cable 408A, second fiber optic cable 408B, third fiber optic cable 408C, and fourth fiber optic cable 408D. Of course, more or fewer fiber optic cables could be used depending on networking requirements and needs. In the exemplary embodiment shown in FIGS. 4A-4C, the first fiber optic cable 408A could be routed by connecting one end of the first fiber optic cable 408A with a port (e.g., first front port) of fiber optic equipment 214 housed within the first front chassis 400A. The first fiber optic cable 408A is then routed generally vertically downward and wrapped around a bottom part of the cylindrical sidewall 368 of the third front fiber routing hub 404C. The first fiber optic cable 408A is then routed generally vertically upward over the front routing cylinder 352A to and through the third fiber routing channel 354C of the fiber terminal rack mount 216 (e.g., from a front to the back of the fiber terminal rack mount 216). Once through the third fiber routing channel 354C, the first fiber optic cable 408A is routed over the back routing cylinder 352B and then generally vertically downward and wrapped around a bottom part of the cylindrical sidewall 368 of the third back fiber routing hub 406C. The second end of the first fiber optic cable 408A is then routed generally vertically upward to a port (e.g., first back port) of fiber optic equipment 214 housed within the second back chassis 402B. The front routing cylinder 352A, back routing cylinder 352B, and fiber routing hub cylindrical sidewall 368 all provide minimum bend radiuses of the fiber optic cables 220, thereby reducing the risk of damage (e.g., due to sharp edges, corners, pinching, etc.) to the fiber optic cables 220.

The other remaining fiber optic cables 408B, 408C, 408D can be similarly routed (e.g., from a second front port to a second back port). More specifically, the second fiber optic cable 408B is routed from the second front chassis 400B, around the second front fiber routing hub 404B, through the first fiber routing channel 354A, around the fourth back fiber routing hub 406D, to the fourth back chassis 402D. The third fiber optic cable 408C is routed from the third front chassis 400C, around the fourth front fiber routing hub 404D, through the second fiber routing channel 354B, around the second back fiber routing hub 406B, to the first back chassis 402A. The fourth fiber optic cable 408D is routed from the fourth front chassis 400D, around the fourth front fiber routing hub 404D, through the fourth fiber routing channel 354D, around the fourth back fiber routing hub 406D, to the third back chassis 402C.

In this manner, the fiber optic cables 220 are routed between the plurality of front chassis 218A to the plurality of back chassis 218B through the fiber routing channels 354A, 354B, 354C, 354D of the fiber terminal rack mount 216 and the slack of the fiber optic cables 220 is minimized. In particular, as shown, the fiber optic cables 220 all follow similar vertical paths. More specifically, the fiber optic cables 220 all follow a generally vertical path from their respective chassis 218A, 218B to a fiber routing hub 230, and a generally vertical path (e.g., along the routing space 306) from a fiber routing hub 230 to their respective fiber routing channel 354A, 354B, 354C, 354D. This facilitates fiber optic cable organization and management by having connections that are easy to follow and trace, and avoids crowding. Of course, this embodiment is exemplary and additional or fewer fiber optic cables 220 could be used, the fiber optic cables 220 could be routed differently, and/or the fiber optic cables 220 could be wrapped differently (e.g., interwoven through the fiber routing hubs 230), depending on networking requirements and needs.

Further, the fiber optic cables 220 are retained in place by a portion thereof being at least partially positioned between the plurality of fiber routing hub fingers 370 and the fiber routing hub mounting base 362, thereby preventing the fiber optic cables 220 from slipping off the fiber routing hub 230. Which fiber routing hub 230 (front and/or back) each of the fiber optic cables 220 wraps around may vary depending on the length of the fiber optic cable 220. For example, the first fiber optic cable 408A wraps around the third front fiber routing hub 404C, but could wrap around the second front fiber routing hub 404B if the first fiber optic cable 408A was shorter, or around the fourth front fiber routing hub 404D if the first fiber optic cable 408A was longer. In all of those scenarios, the first fiber optic cable 408A would be similarly routed, and have reduced slack. Accordingly, the fiber terminal rack mount 216 provides comprehensive and robust front-to-back fiber management.

FIG. 5 is a perspective view of another embodiment of the fiber terminal rack mount 216 of FIG. 4A with a reduced height. As shown in FIG. 5, the fiber terminal rack mount 500 comprises a rack attachment panel 502, chassis attachment panel 504, attachment member (not shown), routing space 306, routing management assembly 308, and fiber routing hubs 230. The fiber terminal rack mount 500 and components thereof are similar to that of FIGS. 2B-4C except where otherwise noted. In particular, the fiber terminal rack mount 500 is sized and configured for a 4U height (e.g., two 2U chassis). Accordingly, the rack attachment panel 502 and chassis attachment panel 504 are reduced in height (e.g., about half) compared with the fiber terminal rack mount 216 of FIGS. 2B-4C. The routing management assembly 308 comprises two shelves 350A, 350B, two front fiber routing hubs 230, and two back fiber routing hubs 230 (not shown).

FIG. 6 is a perspective view of another embodiment of a fiber routing hub 600 of the fiber terminal rack mount 216, 500 of FIGS. 2B-5. The fiber routing hub 600 is similar to that of FIGS. 2B-5, except where otherwise noted. More specifically, the fiber routing hub 600 comprises a mounting base 602 comprising a bottom portion 364B with a bottom slot 366B. A partially cylindrical sidewall 604 (e.g., partially curved sidewall) extends perpendicularly from the mounting base 602, is curved only at a bottom portion thereof (e.g., forming a semicircle), and includes an open top aperture 608. The top slot 606 is positioned in the mounting base 602 at a center of the cylindrical sidewall 604. The fingers 370 extend downwardly and perpendicularly at a second end of the fiber routing hub 600. Thus, the fiber routing hub 600 has a reduced height compared with the fiber routing hub 230 of FIGS. 2B-5 but still provides a wrapping surface for the fiber optic cables 220.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A fiber terminal rack mount for mounting fiber optic equipment in a fiber terminal rack having a front vertical rail set at a front of the fiber terminal rack and a back vertical rail set at a back of the fiber terminal rack, the fiber terminal rack mount comprising:

a rack attachment panel comprising first and second rack attachment flanges vertically oriented at opposite ends of the rack attachment panel, the rack attachment panel configured for the first rack attachment flange to attach to at least one front vertical rail of the front vertical rail set of the fiber terminal rack and the rack attachment panel configured for the second rack attachment flange to attach to at least one back vertical rail of the back vertical rail set of the fiber terminal rack;

a chassis attachment panel comprising at least one chassis attachment flange vertically oriented at an end of the chassis attachment panel, the at least one chassis attachment flange configured to attach to a first chassis facing a first direction; and at least one attachment member positioned between the rack attachment panel and the chassis attachment panel, the at least one attachment member attaching the rack attachment panel and the chassis attachment panel to one another by a separation distance;

wherein the rack attachment panel and the chassis attachment panel at least partially define a routing space between the rack attachment panel and the chassis attachment panel configured to receive and route therein at least a portion of a fiber optic cable between the front and back of the fiber terminal rack.

2. The fiber terminal rack mount of claim 1, wherein the at least one attachment member has a separation length and the separation distance is at least the separation length.

3. The fiber terminal rack mount of claim 1, wherein the at least one chassis attachment flange comprises a first and a second chassis attachment flange, and wherein the first chassis attachment flange is configured to attach to the first chassis facing the first direction, and the second chassis attachment flange is configured to attach to a second chassis facing a second direction opposite the first direction.

4. The fiber terminal rack mount of claim 3, further comprising a plurality of shelves positioned within the routing space, the plurality of shelves defining a plurality of routing channels configured to receive at least a portion of a fiber optic cable therein to connect the first chassis to the second chassis.

5. The fiber terminal rack mount of claim 1, further comprising at least one shelf horizontally positioned within the routing space.

6. The fiber terminal rack mount of claim 5, wherein the at least one shelf comprises a first shelf and a second shelf, the first shelf and the second shelf defining a first fiber routing channel therebetween.

7. The fiber terminal rack mount of claim 6, wherein the at least one shelf further comprises a third shelf, the second shelf and the third shelf defining a second fiber routing channel therebetween.

8. The fiber terminal rack mount of claim 5, further comprising a hollow cylinder horizontally positioned at an end of the at least one shelf.

9. The fiber terminal rack mount of claim 1, further comprising a fiber routing hub comprising a first end and a second end, the first end attached to the chassis attachment panel.

10. The fiber terminal rack mount of claim 9, wherein the fiber routing hub further comprises at least one finger perpendicularly extending from the second end of the fiber routing hub.

11. The fiber terminal rack mount of claim 9, wherein the fiber routing hub further comprises an at least partially curved sidewall extending from the first end to the second end of the fiber routing hub.

12. The fiber terminal rack mount of claim 9, wherein
the at least one chassis attachment flange comprises at least one chassis attachment aperture configured to attach to the first chassis, and
the fiber routing hub is positioned between the routing space and the at least one chassis attachment aperture of the at least one chassis attachment flange.

13. A remote terminal, comprising:
a remote terminal cabinet defining a chamber;
a fiber terminal rack positioned within the chamber of the remote terminal cabinet, the fiber terminal rack having a front vertical rail set at a front of the fiber terminal rack and a back vertical rail set at a back of the fiber terminal rack;
fiber optic equipment comprising a front chassis, back chassis, and a first fiber optic cable, the front chassis positioned at the front of the fiber terminal rack and comprising a first front port, the back chassis positioned at the back of the fiber terminal rack and comprising a first back port, and the first fiber optic cable connecting the first front port in the front chassis to the first back port in the back chassis; and
a fiber terminal rack mount comprising:
 a rack attachment panel comprising first and second rack attachment flanges vertically oriented at opposite ends of the rack attachment panel, the first rack attachment flange attached to at least one front vertical rail of the front vertical rail set of the fiber terminal rack and the second rack attachment flange attached to at least one back vertical rail of the back vertical rail set of the fiber terminal rack;
 a chassis attachment panel comprising first and second chassis attachment flanges vertically oriented at opposing ends of the chassis attachment panel, the first chassis attachment flange attached to the front chassis and the second chassis attachment flange attached to the back chassis; and
 at least one attachment member positioned between the rack attachment panel and the chassis attachment panel, the at least one attachment member attaching the rack attachment panel and the chassis attachment panel to one another by a separation distance;
 wherein the rack attachment panel and the chassis attachment panel at least partially define a routing space between the rack attachment panel and the chassis attachment panel, at least a portion of the first fiber optic cable positioned within the routing space.

14. The remote terminal system of claim 13, wherein the at least one attachment member has a separation length and the separation distance is at least the separation length.

15. The remote terminal system of claim 13, further comprising at least one shelf horizontally positioned within the routing space.

16. The remote terminal system of claim 15, wherein the at least one shelf comprises a first shelf and a second shelf, the first shelf and the second shelf defining a first fiber routing channel therebetween, at least a portion of the first fiber optic cable positioned within the first fiber routing channel.

17. The remote terminal system of claim 16, wherein the at least one shelf further comprises a third shelf, the second shelf and the third shelf defining a second fiber routing channel therebetween.

18. The remote terminal system of claim 17, wherein the front chassis further comprises a second front port, the back chassis further comprises a second back port, and the fiber optic equipment further comprises a second fiber optic cable connecting the second front port to the second back port, at least a portion of the second fiber optic cable positioned within the second fiber routing channel.

19. The remote terminal system of claim 13, further comprising a fiber routing hub comprising a first end and a second end, the first end attached to the chassis attachment panel, the first fiber optic cable at least partially wrapped around the fiber routing hub.

20. The remote terminal system of claim 19, wherein the fiber routing hub further comprises at least one finger perpendicularly extending from the second end of the fiber routing hub, at least a portion of the first fiber optic cable positioned between the at least one finger and the chassis attachment panel.

21. The remote terminal system of claim 19, wherein the fiber routing hub further comprises an at least partially curved sidewall extending from the first end to the second end of the fiber routing hub.

22. The remote terminal system of claim 19, wherein
the first chassis attachment flange comprises at least one chassis attachment aperture configured to attach to a first chassis facing a first direction; and
the fiber routing hub is positioned between the routing space and the at least one chassis attachment aperture of the first chassis attachment flange.

* * * * *